Sept. 6, 1960 T. G. MADDEN ET AL 2,951,523
PRESSURELESS TIRES
Filed Nov. 24, 1958

INVENTORS.
Thomas G. Madden
BY and John Scudder
Elmer L. Quick
Atty.

United States Patent Office 2,951,523
Patented Sept. 6, 1960

2,951,523
PRESSURELESS TIRES

Thomas G. Madden and John A. Scudder, Chicago, Ill., assignors to Maco Industries, Inc., Chicago, Ill., a corporation of Illinois Filed Nov. 24, 1958, Ser. No. 775,875
9 Claims. (Cl. 152—248)

This invention relates to improvements in vehicle tires and is more particularly concerned with a reinforced tubeless or pressureless type tire especially adapted for installation on standard wheels of industrial equipment.

Various attempts have been made to develop a commercially successful reinforced tubeless type tire for heavy equipment but in all known instances such tires have required the use of specially designed rims. Furthermore, known types of prior art reinforced tubeless tires involve structures that are incapable of transmitting high torque when mounted on drive wheels; required the use of specially designed rims; are readily damaged by entrance of foreign matter such as mud, dust.; and are subjected to excessive heat generation and resultant deterioration of the tire. For example in one known instance of inserting a liner within a tire casing, the liner is unbonded to the tire wall and as a result relative slippage between the tire and liner and between the tire and rim occurs when the tire is subjected to high torque unless special means is provided to assure mechanical interlock between the tire and rim. Such slippage generates excessive heat resulting in untimely destruction of the casing which is hastened by the entrance of foreign material between said liner and casing.

The present invention involves a novel structure that overcomes all of the aforesaid disadvantages. Specifically, the present tire is comprised of an outer casing fabricated in the usual manner and having the customary rim engaging peripheral beads so as to be mountable on rims of conventional construction. A semi-tubular sheet metal liner or shell conforms with and is bonded firmly to the inside surfaces of the tire casing. Said liner has its free peripheral edges coincident with or substantially coincident with the inner perimeter of the tire casing and it is so shaped as to present a substantially elliptical cross-section, the minor axis of which is parallel to the rim and its major axis is perpendicular thereto. This configuration produces an assembly wherein the tire casing side walls are more readily flexed than is the central or tread area thereof and impact forces on the tread area causes outward deflection of the side wall areas thus absorbing the shock. Furthermore, owing to the basic cross section of the liner both the beads of the tire casing are urged at all times into tight binding engagement with conventional rim flanges thus preventing slippage arising from torque transmission.

It is therefore an object of the invention to provide a reinforced pressureless tire of a character that will fit standard rims, will transmit high torque and may be easily and quickly mounted and de-mounted on such rims.

Another object is to provide a reinforced tire which will have all of the resiliency and deflection characteristics of a pressurized tire.

Another object is to provide a reinforced tire of the character described with internal supports arranged in a manner to insure maximum deflection without high internal stress or reduction in load carrying capacity.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

Figure 1:
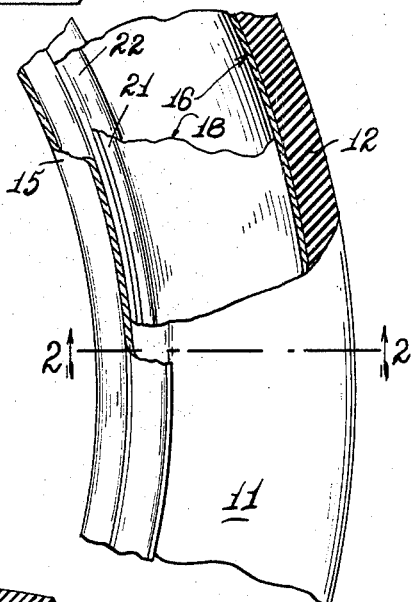
Fig. 1 is a fragmentary side elevational view of a tire embodying features of the present invention, shown mounted on a rim.
Figure 2:
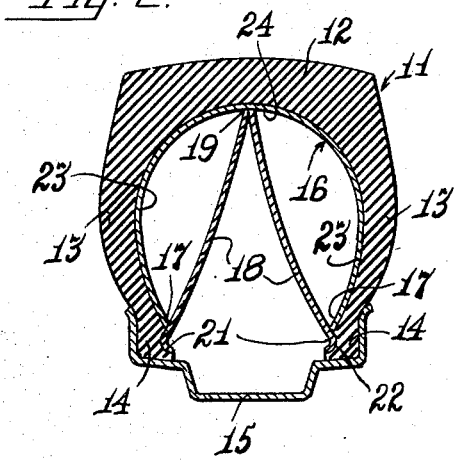
Fig. 2 is a sectional view taken substantially on line 2—2 of Fig. 1.

Referring to the accompanying drawings and particularly to the embodiment shown in Figs. 1 and 2, the improved tire comprises generally a casing 11 which may be of any conventional construction including the usual webbing or cords embedded in rubber, rubber composition or other suitable resiliently compressible material. The casing includes the usual tread area 12 and side walls 13 formed on their inner peripheral edges with conventional beads 14. Because of its likeness to the general configuration of a conventional non-reinforced tire, the structure herein disclosed may be mounted upon any conventional drop center or split ring rim 15 without modification of said rims.

A liner 16 comprised of a continuous band of spring steel or other shape retaining relatively stiff material is formed into an elliptical contour and is arranged within the tire casing 11. It conforms to the inside surface of the tire casing and is bonded firmly thereto, as by vulcanizing or otherwise, so as to be integrally attached permanently. The inner peripheral free edges 17 of the elliptical liner terminate preferably inwardly slightly of the free or beaded edges 14 of said tire casing. In this embodiment the tire casing 11 and liner 16 are reinforced by means of internal supports or webs 18. Each web 18 is fabricated from spring steel sheet in the form of a ring disposed within the lined tire in such manner that the outer peripheral edge 19 of said ring bears firmly against the inside surface of liner 16 at its major axis. It arches laterally and radially inwardly from said point of contact to locate its inner peripheral margin in tight abutmen wtih the tire wall its respective beaded edge 14. Preferably the inner peripheral margin of ring 18 is rolled or otherwise formed, as at 21, and embedded in an annular recess 22 on the inside face of said beaded edge. The two rings or webs 18 are alike except that one is right hand and the other is left hand.

Because of the elliptical configuration of liner 16 and the disposition of its minor axis parallel to rim 15, the side wall areas 23 thereof have greater flexibility than does the center area 24 thereof consequently, the reinforced tire may therefore, deflect readily under impact without causing inward movement of the tire side walls 13 and consequent release of binding tension between the beads 14 and rim 15. The presence of four load bearing areas (side walls 23 of liner and webs 18) results in an assembly wherein high deflection of the tire side walls outwardly under load impact is permitted without sacrificing load capacity. Furthermore, high speed operation or torque transmission does not create high internal stress in the tire.

Figure 3:
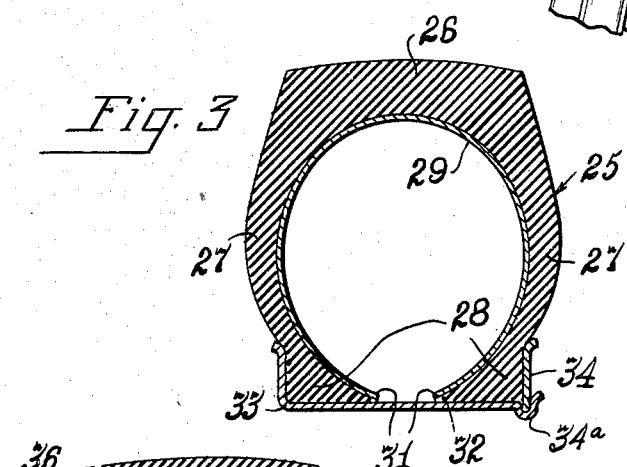
Fig. 3 is a sectional view similar to Fig. 2 but showing a modified structure.

The structure illustrated in Fig. 3 is somewhat like that shown in Fig. 1. In this embodiment, the tire casing 25 is of conventional construction and it includes tread area 26, side walls 27 and rim flange engaging beads 28 on the inner peripheral edges of said side walls. A split tubular liner 29, preferably sheet steel, is bonded to the inside surface of said tire casing and it has its inner peripheral edges 31 terminate flush or substantially flush with the peripheral edges 32 of casing side walls 27 so as to afford adequate reinforcement for the bead areas. The liner 29 is substantially elliptical in section arranged with its major axis perpendicular to the rim 33 and its minor axis parallel thereto. In this instance, the rim 33 illustrated is of the demountable type including a split ring 34. When mounting the tire on rim 33 the tire edges 32 are carried into abutment with rim flange 35 and the ring 34 is then snapped into locking engagement in annular recess 34a. This structure insures maximum side wall deflection without breaking down and also maintains the beads 28 in tight frictional engagement with rim flange 35 and ring 34 to prevent circumferential slippage under driving torque.

Figure 4:
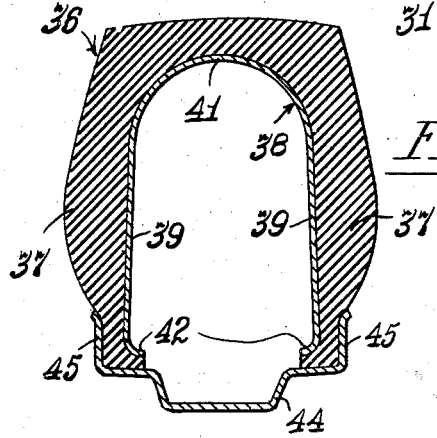
Fig. 4 is a sectional view of another embodiment of the invention.

The Fig. 4 structure differs from the previously described embodiments in that the tire casing 36 has side walls 37 of greater thickness. The liner 38 fabricated from shape retaining material, such as sheet steel, is shaped in section to conform to and is bonded onto the inside surface of the casing. A shown, this liner has substantially straight side wall areas 39 which are joined by the arched outer peripheral wall 41 and terminate at their free inner edges in laterally turned flanges 42. The liner side walls 39 diverge inwardly-radially so as to insure that under stress of impact, said side walls will flex laterally-outwardly to carry the tire beads 43 into tight frictional binding engagement with the inclined margins of the rim 44 and its flanges 45.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

Having thus described the invention, what is claimed as new and desired to be secured by Letters Patent of the United States is:

1. In a tire of the character described, a tire casing having rim engaging beads on its inner peripheral edges and a resiliently deformable shell substantially elliptical in section extending entirely around and bonded to the inside surface of said casing, said shell being split circumferentially on its inner peripheral wall to define free side wall portions capable of outward deflection upon circumferential impact and at least one load bearing wall joining the free edge of a side wall portion of said shell to the outer periphery of said shell, said load bearing wall being arched radially to increase its resiliency to impact.

2. In a tire of the character described, a tire casing having rim engaging beads on its inner peripheral edges and a resiliently deformable liner extending entirely around and bonded to the inside surface of said casing, said liner having free side wall portions capable of outward deflection upon circumferential impact, and at least one load bearing web joining the free edge of a side wall portion of said liner to the outer periphery of said liner, said wall being arched radially to increase its resiliency to impact.

3. In a tire of the character described, a tire casing having rim engaging beads on its inner peripheral edges and a resiliently deformable sheet metal liner extending entirely around and bonded to the inside surface of said casing, said liner being elliptical in section with its major axis parallel to the plane of the tire, the liner being split circumferentially on its inner peripheral wall to define free arched side walls capable of lateral deflection upon radial impact and a pair of load bearing walls joining the free edges of the liner side walls to the outer periphery of said liner, said walls being arched radially to increase their resiliency to impact.

4. In a tire of the character described, a tire casing having rim engaging beads on its inner peripheral edges and a resiliently deformable liner elliptical in section and extending entirely around and bonded to the inside surface of said casing, said liner having free side wall portions capable of outward deflection upon circumferential impact, and at least one sheet metal load bearing annulus joining the free edge of a side wall portion of said liner to the outer periphery of said liner.

5. In a tire of the character described, a tire casing having rim engaging beads on its inner peripheral edge, and a resiliently deformable liner substantially elliptical in section extending entirely around and bonded to the inside surface of said casing, said liner including free side wall portions capable of outward deflection upon circumferential impact, said wall portions terminating at their inner circumferential edges in the area of the tire casing beads, and load bearing rings connecting the free edges of the side wall portions of said liner to the outer periphery of said liner, said rings being arched radially to cause outward lateral thrust of the beaded edges under radial impact.

6. In a tire of the character described, a tire casing having rim engaging inner peripheral edges, a resiliently deformable metal liner having a cross section corresponding to the cross section of the casing interior and bonded to the inside surface of said casing throughout its extent, said liner being split circumferentially on its inner peripheral wall to define free side wall portions capable of outward deflection upon circumferential impact, and at least one load bearing wall of resiliently deformable non-compressible sheet material extending from the free edge of a liner side wall portion to the outer periphery of said liner, said load bearing wall being arched radially to increase its resiliency to impact.

7. In a tire of the character described, a tire casing including a tread portion and side walls having inner peripheral rim engaging edge portions, a resiliently deformable metal liner bonded to the inside surface of said casing throughout its extent, and at least one load bearing wall of resiliently deformable non-compressible sheet material extending from a peripheral rim engaging edge portion of the casing to the liner in the area of the tread portion, said load bearing wall being arched radially to increase its resilience to impact.

8. A tire including a casing of channel section having a tread portion and side walls, said side walls terminating in rim engaging edge portions, an annular liner of channel section within said casing and bonded to the inside surface of said casing throughout its extent, said liner comprising a sheet of hard resiliently deformable non-compressible material and at least one resiliently deformable non-compressible annulus arranged within said liner throughout its extent and having its outer peripheral edge seated against the inside surface of the liner in the area of the tread portion of the casing and its inner peripheral edge seated against the inside surface of the tire in the area of a rim engaging edge portion.

9. A tire of the character recited in claim 8 in which said annulus is dished radially to increase its resiliency against impact.

References Cited in the file of this patent

UNITED STATES PATENTS

| | | |
|---|---|---|
| 2,045,341 | Bourdon | June 23, 1936 |
| 2,338,294 | Maule | Jan. 4, 1944 |
| 2,600,033 | Walklet | June 10, 1952 |